(12) United States Patent
Yin et al.

(10) Patent No.: US 8,456,765 B1
(45) Date of Patent: Jun. 4, 2013

(54) WIDE-CONVERSION LENS

(75) Inventors: Wei Yin, Guangdong (CN); Yang-Cheng Luo, Guangdong (CN); Zi-Yuan Li, Guangdong (CN)

(73) Assignees: Premier Image Technology (China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/454,110

(22) Filed: Apr. 24, 2012

(30) Foreign Application Priority Data

Feb. 24, 2012 (CN) .......................... 2012 1 0043586

(51) Int. Cl.
*G02B 9/60* (2006.01)
(52) U.S. Cl.
USPC .......................................................... 359/770

(58) Field of Classification Search
USPC .................................................. 359/763, 770
See application file for complete search history.

(56) References Cited

U.S. PATENT DOCUMENTS 5,933,286 A * 8/1999 Yamada et al. ............... 359/770

* cited by examiner

*Primary Examiner* — Joseph P Martinez
(74) *Attorney, Agent, or Firm* — Altis Law Group, Inc.

(57) ABSTRACT

A wide-conversion lens, in order from the object-side to the image-side, includes a first lens with negative refraction power, a second lens with negative refraction power, a third lens with positive refraction power, a fourth lens with positive refraction power, and a fifth lens with negative refraction power. The first lens includes a surface facing the object side. The wide-conversion lens satisfies the following conditions: $R1<0$; $V_{d2}-V_{d1} \geq 19$; $V_{d2}-V_{d3} \geq 35$. Wherein, R1 is the curvature radius of the surface of the first lens; $V_{d1}$ is the Abbe number of the first lens; $V_{d2}$ is the Abbe number of the second lens; $V_{d3}$ is the Abbe number of the third lens.

13 Claims, 5 Drawing Sheets

WIDE-CONVERSION LENS

BACKGROUND

1. Technical Field

The disclosure relates to a lens system and, particularly, to a wide-conversion lens having a small number of lens components and a short overall length.

2. Description of Related Art

A short overall length is demanded for use in wide-conversion lens for image acquisition. The wide-conversion lens is mounted in relatively thin equipment, such as simple digital cameras, webcams for personal computers, and portable imaging systems in general. In order to satisfy this demand of compact wide-conversion lens, conventional wide-conversion lens reduce the number of lenses to shorten the overall length, but this will decrease the resolution. Increasing the number of lenses can increase resolution, but will also increase the overall length of the wide-conversion lens.

What is needed, therefore, is a wide-conversion lens to overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail below, with reference to the accompanying drawings.

Figure 1:
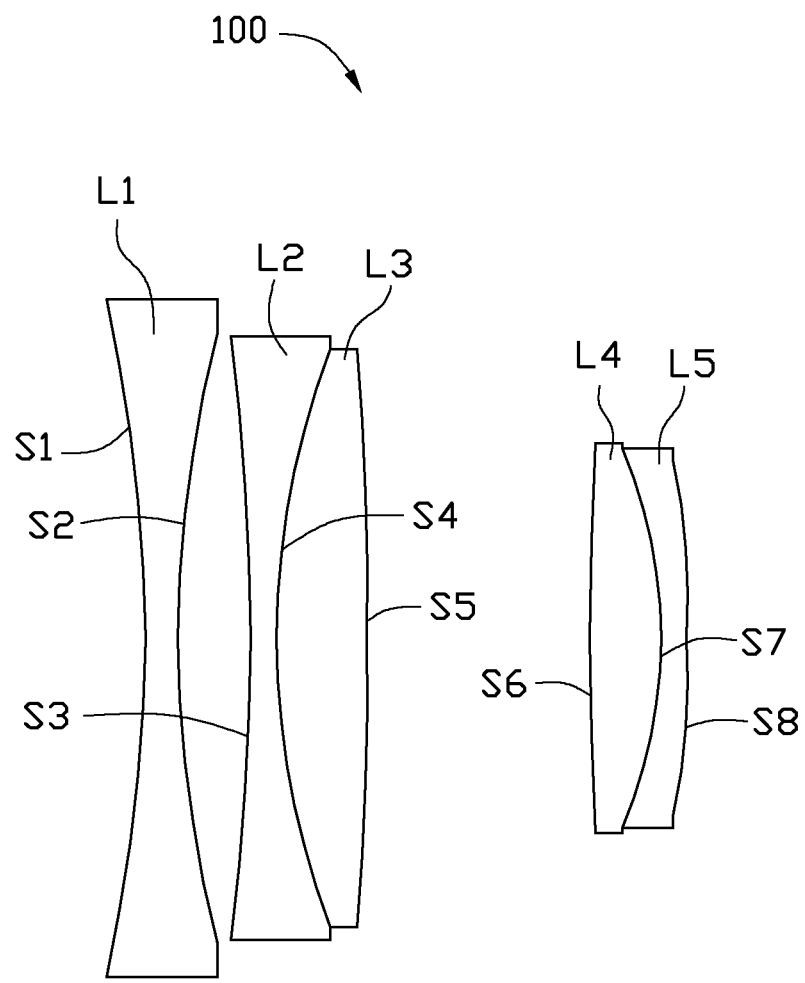
FIG. 1 is a schematic view of a wide-conversion lens of the present disclosure.

FIG. 1, is a wide-conversion lens 100 including, in order from the object-side to the image-side, a first lens L1 with negative refraction power, a second lens L2 with negative refraction power, a third lens L3 with positive refraction power, a fourth lens L4 with positive refraction power, and a fifth lens L5 with negative refraction power. In the embodiment, a total length of the wide-conversion lens 100 is 43.7 mm, and a zoom magnification is 0.66.

The first lens L1 is glass lens having biconcave shape. The first lens L1 includes, in order from the object-side to the image-side of the wide-conversion lens 100, a first surface S1 facing the object side and a second surface S2 facing the image side.

The second lens L2 is glass lens having biconcave shape. The second lens L2 includes, in order from the object-side to the image-side of the wide-conversion lens 100, a third surface S3 facing the object side and a fourth surface S4 facing the image side.

The third lens L3 and the second lens L2 are attached together to form a single unit. The third lens L3 is glass lens having biconvex shape. The third lens L3 includes, in order from the object-side to the image-side of the wide-conversion lens 100, the fourth surface S4 and a fifth surface S5 facing the image side.

The fourth lens L4 is glass lens having biconvex shape. The fourth lens L4 includes, in order from the object-side to the image-side of the wide-conversion lens 100, a sixth surface S6 and a seventh surface S7 facing the image side.

The fifth lens L5 and the fourth lens L4 are attached together to form a single unit. The fifth lens L5 is glass lens having meniscus shape. The fifth lens L5 includes, in order from the object-side to the image-side of the wide-conversion lens 100, the seventh surface S7 and a convex eighth surface S8 facing the image side.

In order to obtain low distortion, good imaging quality, a compact configuration, and wide angle view, the wide-conversion lens 100 satisfies the following conditions:

$$R1 < 0; \tag{1}$$

$$V_{d_2} - V_{d_1} \geqq 19; \tag{2}$$

$$V_{d_2} - V_{d_3} \geqq 35; \tag{3}$$

wherein, R1 is the curvature radius of the first surface S1 of the first lens L1; $V_{d1}$ is the Abbe number of the first lens L1; $V_{d2}$ is the Abbe number of the second lens L2; $V_{d3}$ is the Abbe number of the third lens L3.

The conditions (1)-(3) can favorably limit the relation between the focal length of every lens group and the focal length of the lens system 100 to obtain a high resolution. When the conditions $V_{d_2} - V_{d_1} \geqq 19$ and $V_{d_2} - V_{d_3} \geqq 35$ are met, chromatic aberrations are effectively reduced and imaging performance is improved.

In one embodiment, the wide-conversion lens 100 further satisfies the following condition:

$$0.5 \leqq f_1/f_2 \leqq 1; \tag{4}$$

wherein, $f_1$ is a focal length of the first lens L1; $f_2$ is a focal length of the second lens L2. The condition (4) can reduce the aberration of the field curvature and spherical aberration in the wide-conversion lens 100.

In the embodiment, the first, second, third, fourth, fifth, sixth, seventh, eighth surfaces S1, S2, S3, S4, S5, S6, S7 and S8 all are spherical.

Example diagrams of the wide-conversion lens 100 will be described below with reference to FIGS. 2-5. The disclosure is not limited to these examples. The following are symbols used in each exemplary embodiment.

ri: radius of curvature of the surface Si;

Di: distance between surfaces on the optical axis of the surface Si and the surface Si+1;

Ni: refractive index of the surface Si;

Vi: Abbe constant of the surface Si; and

Table 1 shows the specifications of a first embodiment of the wide-conversion lens 100.

TABLE 1

| Surface | ri(mm) | Di(mm) | Ni | Vi |
|---|---|---|---|---|
| S1 | −111.391 | 2.300 | 1.883 | 40.8 |
| S2 | 98.794 | 6.000 | — | — |
| S3 | −186.420 | 2.118 | 1.64 | 60.2 |
| S4 | 66.207 | 7.362 | 1.847 | 23.78 |
| S5 | −301.057 | 18.000 | — | — |
| S6 | 329.961 | 5.866 | 1.696 | 55.5 |

TABLE 1-continued

| Surface | ri(mm) | Di(mm) | Ni | Vi |
|---|---|---|---|---|
| S7 | −37.267 | 2.050 | 1.762 | 26.6 |
| S8 | −86.105 | — | — | — |

In the embodiment, the focal length $f_1$ of the first lens L1 is −58.6 mm, the focal length $f_2$ of the second lens L2 is −75.78 mm.

Figure 2:
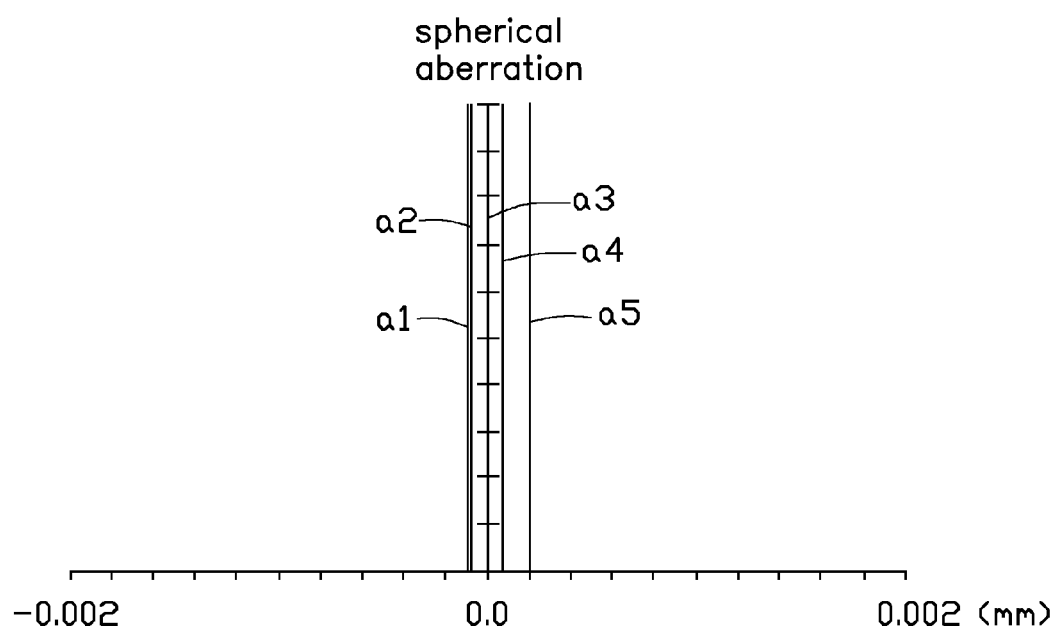
FIG. 2 is a graph showing characteristic curves of axes spherical aberration of the wide-conversion lens of FIG. 1 in accordance with a first embodiment.
Figure 3:
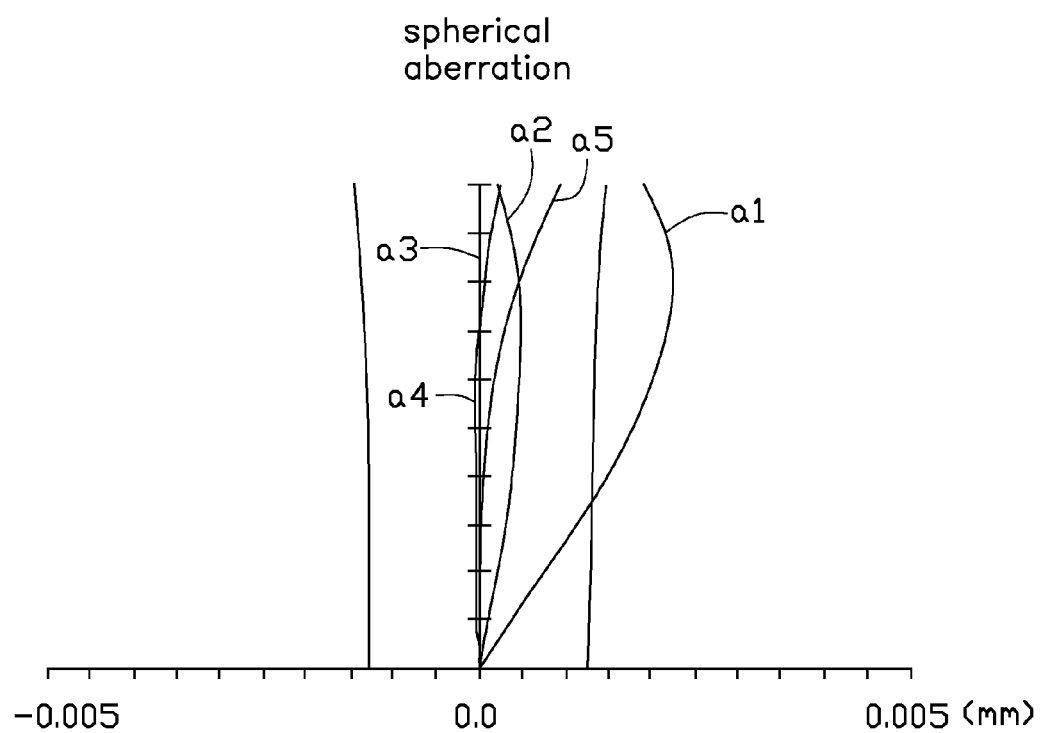
FIG. 3 is a graph showing characteristic curves of vertical axes spherical aberration of the wide-conversion lens of FIG. 1 in accordance with the first embodiment.

FIGS. 2-3, are graphs of aberration (spherical aberration) of the wide-conversion lens 100. In FIG. 2, curves are spherical aberration characteristic curves of a1 light (wavelength: 436 nm), a2 light (wavelength: 486 nm), a3 light (wavelength: 546 nm), a4 light (wavelength: 588 nm), and a5 light (wavelength: 588 nm) of the lens system 100. The axes spherical aberration of wide-conversion lens 100 of the first exemplary embodiment is from −0.002 mm to 0.002 mm. As illustrated in FIG. 3, the vertical axes spherical aberration of wide-conversion lens 100 of the first exemplary embodiment is from −0.005 mm to 0.005 mm.

Aberrations occurring in the wide-conversion lens 100 are controlled/corrected to an acceptable level, and changes in aberrations are reduced to acceptable levels as well, accordingly, a high resolution of the wide-conversion lens 100 is obtained, and wide angle view of the wide-conversion lens 100 is also obtained.

Table 2 shows the specifications of a second embodiment of the wide-conversion lens 100.

TABLE 2

| Surface | ri(mm) | Di(mm) | ni | vi |
|---|---|---|---|---|
| S1 | −316.95 | 2.205 | 1.88 | 40.8 |
| S2 | 72.853 | 5.977 | — | — |
| S3 | 243.507 | 2.100 | 1.64 | 60.2 |
| S4 | 45.332 | 8.001 | 1.85 | 23.8 |
| S5 | 215.267 | 12.0566 | — | — |
| S6 | 158.638 | 7.401 | 1.70 | 55.5 |
| S7 | −40.582 | 2.050 | 1.76 | 26.6 |
| S8 | −125.243 | — | — | — |

In the embodiment, the focal length $f_1$ of the first lens L1 is −66.52 mm, the focal length $f_2$ of the second lens L2 is −87.05 mm.

Figure 4:
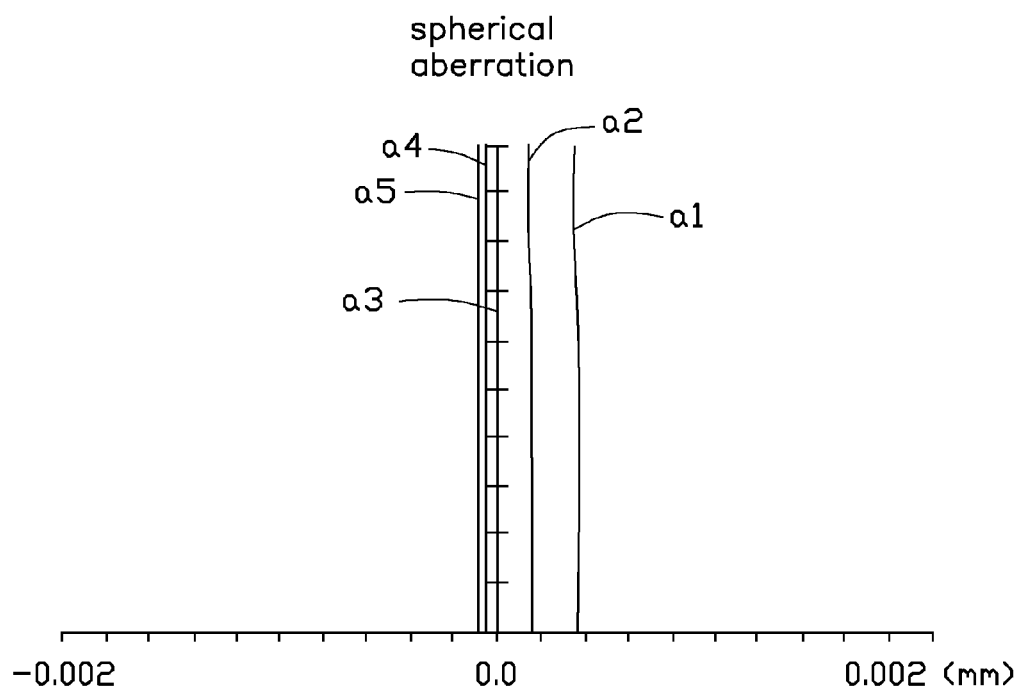
FIG. 4 is a graph showing characteristic curves of axial spherical aberration of the wide-conversion lens of FIG. 1 in accordance with a second embodiment.
Figure 5:
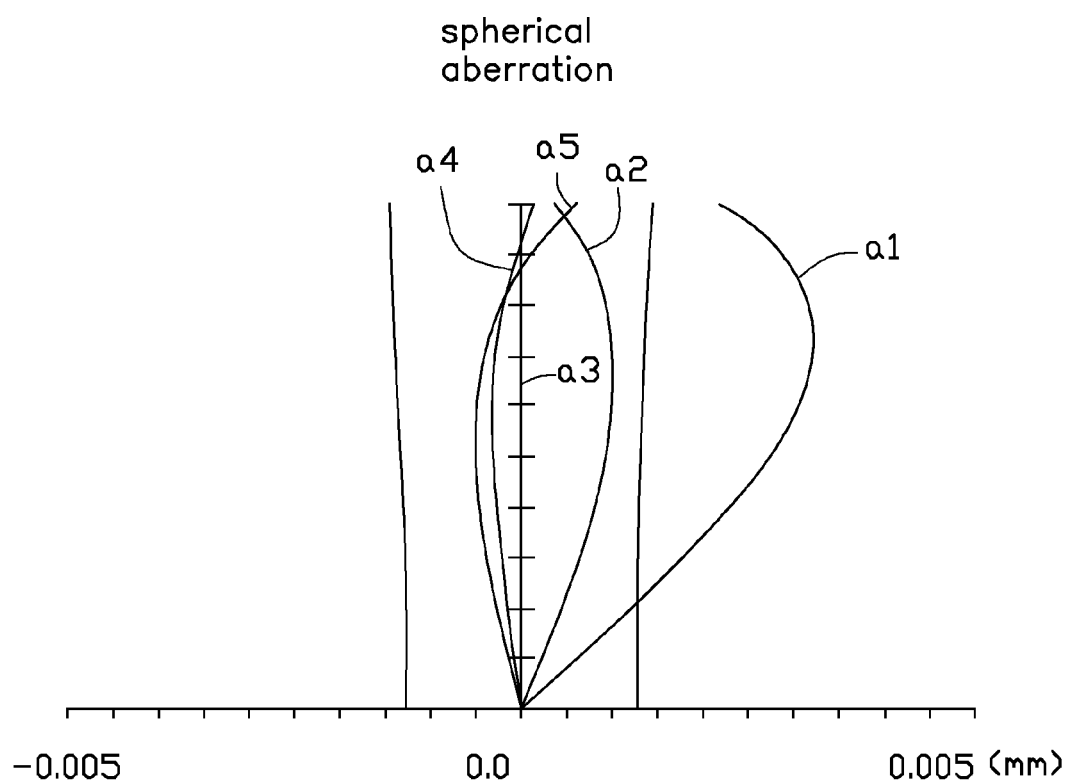
FIG. 5 is a graph showing characteristic curves of vertical axial spherical aberration of the wide-conversion lens of FIG. 1 in accordance with the second embodiment.

FIGS. 4-5, are graphs of aberration (spherical aberration) of the wide-conversion lens 100. In FIG. 4, curves are spherical aberration characteristic curves of a1 light (wavelength: 436 nm), a2 light (wavelength: 486 nm), a3 light (wavelength: 546 nm), a4 light (wavelength: 588 nm), and a5 light (wavelength: 588 nm) of the lens system 100. The axes spherical aberration of wide-conversion lens 100 of the second exemplary embodiment is from −0.002 mm to 0.002 mm. As illustrated in FIG. 5, the vertical axes spherical aberration of wide-conversion lens 100 of the second exemplary embodiment is from −0.005 mm to 0.005 mm.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. A wide-conversion lens, in order from the object-side to the image-side thereof, comprising:
    a first lens with negative refraction power, and comprising a surface facing the object side;
    a second lens with negative refraction power;
    a third lens with positive refraction power;
    a fourth lens with positive refraction power;
    a fifth lens with negative refraction power;
    wherein the wide-conversion lens satisfies the following conditions:

$$R1<0; \qquad (1)$$

$$V_{d2}-V_{d1} \geqq 19; \qquad (2)$$

$$V_{d2}-V_{d3} \geqq 35; \qquad (3)$$

wherein, R1 is the curvature radius of the surface of the first lens; $V_{d1}$ is the Abbe number of the first lens; $V_{d2}$ is the Abbe number of the second lens; $V_{d3}$ is the Abbe number of the third lens.

2. The wide-conversion lens of claim 1, wherein the wide-conversion lens further satisfies the following condition:

$$0.5 \leqq f_1/f_2 \leqq 1; \qquad (4)$$

wherein, $f_1$ is a focal length of the first lens; $f_2$ is a focal length of the second lens.

3. The wide-conversion lens of claim 2, wherein $f_1$ is −58.6 mm, and $f_2$ is −75.78 mm.

4. The wide-conversion lens of claim 2, wherein $f_1$ is −66.52 mm, and $f_2$ is −87.05 mm.

5. The wide-conversion lens of claim 1, wherein a total length of the wide-conversion lens is 43.7 mm, and a zoom magnification is 0.66.

6. The wide-conversion lens of claim 1, wherein the first lens is a glass lens having biconcave shape.

7. The wide-conversion lens of claim 1, wherein the second lens is a glass lens having biconcave shape.

8. The wide-conversion lens of claim 1, wherein the third lens and the second lens are attached together to form a single unit.

9. The wide-conversion lens of claim 1, wherein the third lens is a glass lens having biconvex shape.

10. The wide-conversion lens of claim 1, wherein the fourth lens is a glass lens having biconvex shape.

11. The wide-conversion lens of claim 1, wherein the fifth lens and the fourth lens are attached together to form a single unit.

12. The wide-conversion lens of claim 1, wherein the fifth lens is a glass lens having meniscus shape, and comprises a convex surface facing the image side.

13. The wide-conversion lens of claim 1, wherein the first, second, third, fourth, and fifth lenses all are spherical lenses.

* * * * *